H. O. RUGH.
NOVELTY POST CARD.
APPLICATION FILED JAN. 27, 1920.

1,396,693.

Patented Nov. 8, 1921.

INVENTOR
Harry O. Rugh
BY Frank M. Slough
ATTORNEY

UNITED STATES PATENT OFFICE.

HARRY O. RUGH, OF CHICAGO, ILLINOIS.

NOVELTY POST-CARD.

1,396,693.      Specification of Letters Patent.      Patented Nov. 8, 1921.

Original application filed August 21, 1919, Serial No. 318,865. Divided and this application filed January 21, 1920. Serial No. 353,059.

*To all whom it may concern:*

Be it known that I, HARRY O. RUGH, a citizen of the United States, and a resident of Chicago, in the county of Cook and State of Illinois, have invented certain new and useful Improvements in Novelty Post-Cards, of which the following is a full, clear, concise, and exact description, reference being had to the accompanying drawings, forming a part of this specification.

My invention relates to improvements in postcards, and more particularly to the provision of a postcard novelty comprising an inclosed mirror, not subject to be broken when sent through the mails.

It is a principal object of my invention to provide a novel and improved device of this general character, wherein the mirror comprises a metal sheet having a highly polished mirror surface and in which the polished surface is protected from damage when not in use. It is another object of my invention to provide cover members for the said metallic sheet to protect the same, and when the mirror device is used as a postcard and sent through the mails to protect other mail matter from the edges of the said metal sheet.

I also so stamp out the mirror and cover members in disk form, that they may be slightly bowed, or dished to have an outer convex surface; when rotatably connected together near one edge of the disk members, as will be later described, by means of this convex surface, the different disk units comprising the novelty device, are normally centered and by virtue of the friction between them to tend to remain in normal, mirror closing position. It is a further object of my invention, therefore, to provide a structure having this advantage, and also, at the same time, to thereby secure a convex mirror surface which has the additional virtue of reflecting to the eyes of the user, an image large enough to show all of the user's features; that is, I provide a mirror surface of small area which may reflect an image of the entire face of the user, even when the mirror is placed closely thereto.

It is a further object of my invention to provide in such a novelty postcard, a mirror surface protecting cover, which normally rests against the said mirror only at the edges thereof, this, by virtue of providing greater dishing of the mirror cover as compared with the dishing of the mirror disk.

Another object of my invention is, to prevent relative displacement of the mirror member proper and the back cover of the mirror and to provide for the front cover of the mirror an inner coating of soft non-abrasive material.

This inner coating of soft non-abrasive material not only protects the mirror surface, but also due to the novel arrangement of the elements herein below set forth exerts a polishing action upon the mirror surface to keep it from becoming dull. The mirror surface is preferably composed of a coating of metallic nickel upon a sheet metal backing composed of steel or brass, and it is a well known fact that such a polished surface will become dull in time and this is taken care of in my improved structure by the arrangement herein described.

A further object of my invention is to provide outer surfaces on front and back mirror covers, for the inscribing of a message such as an advertising message, and for the placing of a stamp, name and address on one of the covers, and for the placing of a message to the intended recipient on the other mirror cover.

This application is a division of my prior filed application, Serial No. 318,865, filed Aug. 21, 1919, which issued into Patent 1,347,593, July 27, 1920.

Other objects of my invention, and the invention itself will be better understood from the description thereof which follows, and in which description reference will be had to the accompanying figures illustrating a preferred embodiment of my invention.

Fig. 5, shows a side cross-sectional view of the three main disk members when clamped together by the eyelets above referred to.

Figure 5:
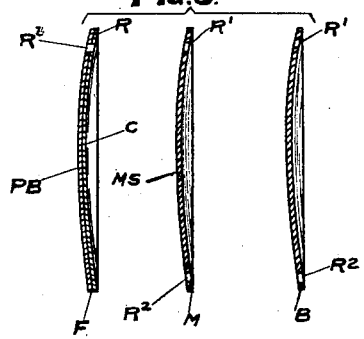

Referring now particularly to Fig. 5, at M, I show a slightly bowed or dished metallic disk member having an outer convex mirror surface MS, and which metallic disk is stamped from a thin sheet of metal, one surface of which has previously been coated with a metallic coat of high luster and which coated surface reflecting is of high power. The mirror disks are stamped from this coated sheet of metal in such a way that the mirror disk becomes dished, the polished surface of high luster, being the convex surface of the dish. Preferably at the same time this disk is stamped out, it is perforated to form the rivet holes $R^1$ and $R^2$. The back cover member B is formed in like manner being preferably stamped from a press board sheet and dished in the same manner and having the same degree of convexity as the mirror member M. The front cover F is preferably stamped from a sheet of coated press-board; outer press board portion being shown at PB and the inner coat portion being shown at C; the press board sheet is coated before the stamping of the disks so that the member F comprising the coated press board is stamped out as a single unitary disk. The coating may consist of a paper having a very soft texture, or it may be of some kind of soft cloth. This front member is preferably dished to a greater degree than the intermediate mirror, or the back cover member, and is perforated at $R^3$.

When the device of my invention is assembled the members F, M, and B are securely fastened together by a rivet R as shown in the assemblage drawings of Figs. 1 to 4 inclusive. This rivet R passes through perforation, $R^3$, of the member F, and perforations $R'$, of the members M and B respectively.

Figure 2:
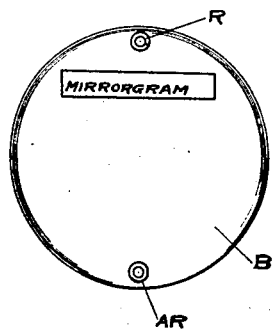
Fig. 2, shows a rear view of the postcard in normal closed condition, the other end of the said eyelet being shown in this figure together with an additional lower eyelet which, coöperating with the first eyelet, non-rotatably holds the back cover member and the mirror member together.
Figure 3:
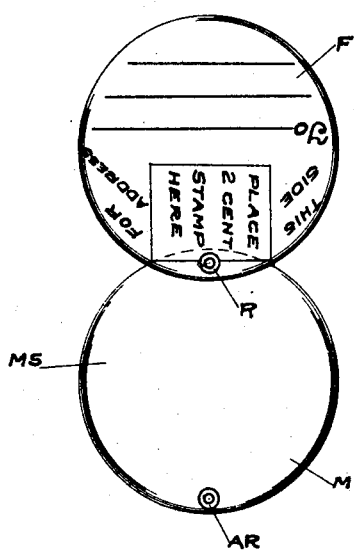
Fig. 3, shows a front view of the postcard in operative or opened condition, wherein the front cover is rotated about the securing eyelet as an axis to expose the polished mirror.
Figure 4:
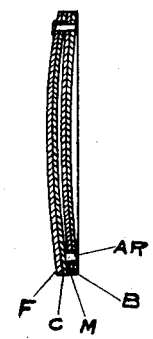
Fig. 4, shows a side cross-sectional view of the postcard in normal closed position.

Also as illustrated in Figs. 2, 3 and 4, a second rivet AR is employed to securely hold together the members M and B, so that the members M and B are non-rotatably secured together with respect to each other by means of the rivets R and Ar. The disk member F, comprising the front cover of the novelty device, however, is rotatably secured by means of the rivet member R to the other disk members M and B. The user of the postcard novelty is thus enabled to rotate the cover F upon the eyelet axis R so as to expose the mirror surface MS to view.

Figure 1:
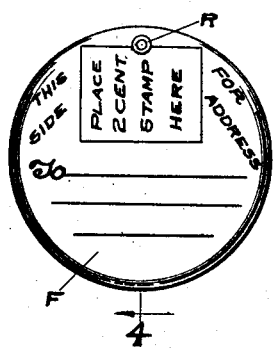
Figure 1, illustrates a front view of the novelty postcard of my invention, in normal closed condition. In this view the front cover and an eyelet to secure the mirror members together alone are shown.

Figs. 1, 2 and 3 show typical inscriptions adapted to be placed on the cover members F and B by the manufacturer thereof. It is obvious that a purchaser by placing the intended recipient's name and address on spaces provided therefor, on the cover member F, and adding a postage stamp in the provided space, may send the postcard novelty through the mails to the recipient to convey a message to the said recipient, which message may be inscribed on the back of the cover member B.

I preferably make the metallic intermediate disk of slightly less diameter than the other disks in order to enable the outer disk edges to protect other mail matter from possible injury by the relatively sharp edges of the metallic disk.

Having thus described my invention I wish it to be understood that while I have illustrated and described a specific embodiment thereof for the purpose of explaining my invention, I am aware that numerous and extensive departures may be made from the embodiment illustrated and described, without departing from the spirit of my invention, but what I claim as my invention, is defined in the following claims:

1. As a new article of manufacture, a postcard comprising two dished disk members rotatably secured together near an edge thereof, a third dished disk member nonrotatably secured to one of the aforesaid disks, the said third member providing an outer surface for a suitable mailing inscription and an outer surface of one of the other disks providing the other surface for a suitable mailing inscription.

2. As a new article of manufacture, a postcard comprising two outer disk members rotatably secured to each other near an edge of the said members, one of the said members presenting a convex outer surface having spaces marked thereon for a postage stamp and a name and address, the other said member, having an outer concave surface suitable for the inscription of a message.

3. As a new article of manufacture, a postcard comprising two outer disk members rotatably secured to each other near an edge of the said members, one of the said members presenting a convex outer surface having spaces indicated thereon for a postage stamp and a name and address, the other said member having an outer concave surface suitable for the inscription of a message, and an intermediate dished disk member secured between the other disk members.

4. As a new article of manufacture, a post card comprising two outer disk members rotatably secured to each other near an edge of the said members, one of the said members presenting a convex outer surface having spaces marked thereon for a postage stamp and a name and address, the other said member, having an outer concave surface suitable for the inscription of a message, and an intermediate dished disk member secured between the other disk members, said last named member having a mirror reflecting surface.

5. As an article of manufacture, a postcard comprising two outer disk members rotatably secured to each other near an edge of the said members, one of the said members presenting a convex outer surface having spaces thereon for a postage stamp, a name, and an address, the other said member, having an outer concave surface suitable for the inscription of a message, and an intermediate dished disk member secured between the other disk members, said last named member having a convex mirror surface.

6. As a new article of manufacture, a postcard comprising two outer disk members rotatably secured to each other near an edge of the said members, one of the said members presenting a convex outer surface having spaces marked thereon for a postage stamp and a name and address, the other said member, having an outer concave surface suitable for the inscription of a message, and an intermediate dished disk member secured between the other disk members, said last named member having a convex mirror surface, said second disk and said last named member being non-rotatably secured together.

7. As a new article of manufacture, a postcard comprising two outer disk members rotatably secured to each other by a rivet near an edge of the said members, said rivet serving as an axis upon which said disks may be rotated, said disk members being dished, and an intermediate dished disk member secured between the other disk members by the said rivet, said last named member having a convex mirror reflecting surface.

8. As a new article of manufacture, a postcard comprising two dished disk members rotatably secured together near an edge thereof, a third dished disk member non-rotatably secured to one of the said disks, the said third member and one of the other disks each being provided with a suitable outer surface for the placing of a mail inscription, and message, the other disk being of metal having a reflecting surface of high luster.

9. As a new article of manufacture, a postcard comprising two dished disk members rotatably secured together near an edge thereof, a third dished disk member non-rotatably secured to one of the said disks, the said third member and one of the other disks each being provided with a suitable outer surface for the placing of a mail inscription and message, the other disk being metallic having a reflecting surface of high luster, said last named metallic disk being of slightly less diameter than the other disks.

10. As a new article of manufacture, a postcard comprising three dished disk members, securing means to secure the said members together near one edge of each member, other securing means to secure two of the said members, to other said member being capable of rotation on the said first named securing means as an axis, the outer disks being provided with a suitable outer surface for the placing of an inscription.

11. As an article of manufacture, a postcard comprising two dished disk members rotatably secured together near an edge thereof, a third dished disk member non-rotatably secured to one of the said disks, the said third member and one of the other disks each being provided with a suitable outer surface for the placing of a mail inscription and message.

In witness whereof, I hereunto subscribe my name this 16th day of December A. D. 1919.

HARRY O. RUGH.